Jan. 12, 1943.   R. R. DREISBACH   2,308,416
METHOD OF DISSOLVING ORGANIC THERMOPLASTICS
Filed March 13, 1941
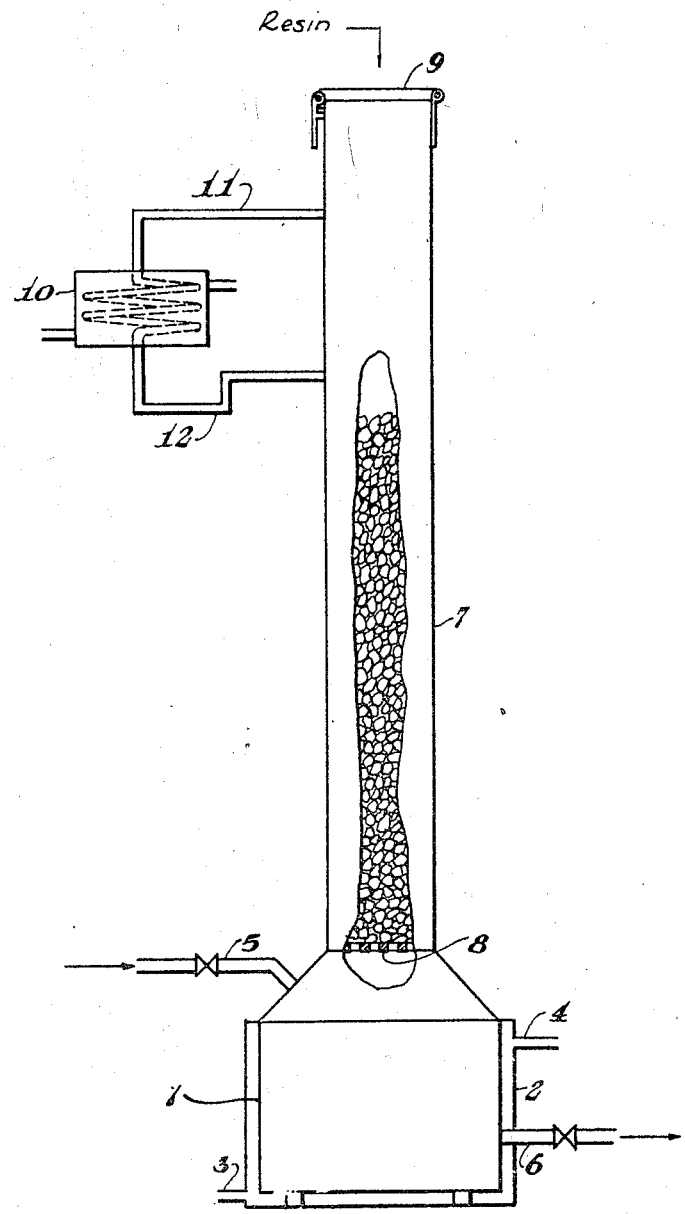
INVENTOR
Robert R. Dreisbach
BY
Griswold & Burdick
ATTORNEYS Patented Jan. 12, 1943

2,308,416

UNITED STATES PATENT OFFICE 2,308,416

METHOD OF DISSOLVING ORGANIC THERMOPLASTICS

Robert R. Dreisbach, Midland, Mich., assignor to The Dow Chemical Company, Midland, Mich., a corporation of Michigan Application March 13, 1941, Serial No. 383,179

6 Claims. (Cl. 260—32)

This invention concerns an improved method of dissolving thermoplastic resins, whereby solutions of such resins may rapidly and conveniently be prepared. This application is a continuation-in-part of my co-pending application Serial No. 258,259, filed February 24, 1939.

A variety of thermoplastic organic resins are known which are soluble, or fairly so, in one or more usual organic solvents, e. g. benzene, toluene, xylene, chlorobenzene, ethylene chloride, propylene chloride, ethyl acetate, or amyl acetate, etc.; and which may be used in lacquers and other coating compositions: Examples of such thermoplastic resins are the cellulose esters and ethers, such as cellulose acetate, ethyl cellulose, propyl cellulose and benzyl cellulose; polymerized vinyl and vinylidene esters, such as polymers and co-polymers of vinyl chloride, vinlidene chloride, ethyl acrylate, and methyl methacrylate; and vinyl aromatic resins, such as polymers and co-polymers of styrene, ortho-methyl-styrene, meta-methyl-styrene, para-methyl-styrene, ortho-ethyl-styrene, para-ethyl-styrene, para-chloro-styrene, divinyl benzene, and vinyl naphthalene; etc.

In the manufacture of coating compositions from such resins, and also in the preparation and purification of the resins themselves, it frequently is desirable to dissolve the solid resins and obtain solutions thereof. This has heretofore been a slow and tedious operation. When a thermoplastic resin is dissolved by the usual operations of immersing the solid resin in a solvent and heating the mixture, the surfaces of the resin in immediate contact with the solvent swell and dissolve, forming a gel or a viscous lacquer over the undissolved resin. The viscous coating thus formed prevents ready access of further solvent to the undissolved portion of the resin, so that the time required to dissolve an appreciable amount of resin is excessive. Vinyl aromatic resins are particularly difficult to dissolve rapidly.

In my earlier attempts to overcome these difficulties and obtain rapid dissolving, I circulated a heated solvent under pressure through a chamber containing a granular thermoplastic resin. The rate of dissolving was little, if any greater, than that obtained by heating a mixture of the granular resin and the solvent in the usual batchwise manner. It was noted that the granules of resin became fused together forming channels through which the solvent flowed without rapid dissolving of the resin.

An object of this invention is to provide an improved method, whereby thermoplastic resins may rapidly be dissolved in solvents.

I have found that whereas thermoplastic resins dissolve only sluggishly when fully immersed in solvents, they may be dissolved readily and rapidly by contacting the same with a solvent under conditions which permit the resultant resin solution to drain away from the undissolved portions of the resin so that the latter may be contacted with fresh solvent. I have further found that such drainage and simultaneous contact of residual undissolved resin with additional solvent may conveniently be obtained by passing inert vapors, e. g. of steam, carbon dioxide, or preferably of the solvent itself, upward through a bed of the resin in granular or lump form, while introducing a liquid solvent into contact with the resin and permitting it to drain downward through the mass. The upward flowing vapors appear to aid in breaking up pockets of the resin solution which might otherwise accumulate between the lumps of granules of resin and prevent rapid dissolving. If such pockets are permitted to form, the undissolved polymer together with the viscose solution of dissolved polymer gradually fuses or cements together as a relatively imporous mass and further dissolving occurs only sluggishly. I have found also that rapid dissolving of thermoplastic resins is conveniently obtained by boiling a solvent for the resin and causing the vapors to pass upward into or through a body of the resin in granular or lump form. By operating in this manner, solvent vapors may be caused to condense on the surfaces of the resin, the latent heat thus liberated aiding in causing solution, and the upward flow of solvent vapors through the resin body aids in maintaining passages through which the resultant resin solution may drain away from undissolved resin.

The accompanying drawing is a diagrammatic sketch showing one of the various forms of apparatus which may be employed in practicing the invention. In the drawing, the numeral 1 designates a boiler, which may be provided, as indicated, with the heating jacket 2 having an inlet 3 and an outlet 4 for passage of a heating fluid therethrough. The boiler 1 is provided with a liquor inlet 5 and outlet 6. The latter is preferably located somewhat above the bottom and at one side of the boiler so as to avoid carrying any heavy solids, e. g. particles of undissolved resin, in the outflowing solution, but this is not essential. Surmounted on boiler 1 is a vertical tower 7 which is provided near its lower end with a grating 8 for supporting solids therein. Tower 7 is preferably, though not necessarily, provided with a cap 9 which may be opened or removed when solids are to be charged into the tower. If desired, such cap may be omitted and the upper end of the tower be open. The tower 7 is also advantageously provided near its upper end with a condenser 10 and the connecting vapor and liquor lines 11 and 12, as indicated, but these are not essential and may be omitted, particularly when the cap 9 also is omitted.

In preparing a solution of a thermoplastic resin using apparatus such as that illustrated in the drawing, the tower 7 is filled from the top with lumps or granules of the solid resin, preferably to a point somewhat below line 12. The boiler 1 is charged with a solvent for the resin and is heated, e. g. by passing steam or hot oil through the jacket 2 or in other of the usual ways. The tower is advantageously vented until the solvent vapors rise in the tower to a level well within or above the resin and suitably as high as the vapor line 11, at which time the tower may be closed, e. g. with cap 9, and the condenser 10 be operated. The solvent vapors are thus caused to flow upward into the body of resin and at least partially to condense on the surfaces of the latter. Solvent vapors rising above the resin flow through vapor line 11 to the cooler 10 where they are condensed and the condensate is returned through line 12 to the tower where it flows downward through the body of resin countercurrent to the upward flow of the vapors. As hereinbefore mentioned, the upward flow of vapors into the body of resin facilitates rapid drainage of the resin solution. Operation in such manner is continued until the resin solution which accumulates in boiler 1 contains the resin in the desired concentration. The solution is withdrawn through outlet 6. If desired, the dissolver may be operated continuously by feeding solvent into the system through inlet 5 and withdrawing the resin solution through outlet 6 at the rates necessary to produce a solution of the desired concentration. Additional solid resin may periodically be added to the tower.

Example

The purpose of this example is to demonstrate the decrease in time required to dissolve a thermoplastic resin which is brought about by contacting the resin with the vapors and reflux of a boiling solvent instead of immersing it in the heated solvent. In the first of two experiments, a section of horizontal pipe was charged with granular polystyrene. Coal tar naphtha heated at temperatures between 70° and 90° C. was circulated with a pump through the pipe until the concentration of polystyrene in the circulating liquid was 8 per cent by weight. It required 70 hours of continuous circulation to dissolve sufficient polymer to produce a solution of said concentration. It was noted that the residual polymer in the pipe had become cemented together as a substantially imporous, but channeled, mass. In the other experiment the same solvent, which at atmospheric pressure distills for the most part at temperatures between 70° and 90° C., was boiled under reflux using a reflux column which was charged with polystyrene. After approximately 7.5 hours of refluxing, the liquor contained 8 per cent by weight of dissolved polystyrene.

The invention may be practiced in other ways. For instance, it may be applied by causing a solvent to flow or trickle downward through a bed of a resin in lump or granular form, while passing an inert gas or vapor, e. g. nitrogen, steam, methane, or carbon dioxide, etc., upward through the bed to prevent as nearly as possible pocketing of resin solution within the bed and thus facilitate drainage of the solution. This mode of operation permits rapid dissolving of the resin at temperatures below the boiling point of the solvent. It is advantageously applied in dissolving those resins which are more soluble at low temperatures, e. g. room temperature or thereabout, than at higher temperatures. The solubility of most thermoplastic resins in usual solvents increases with rise in the temperature, and such resins are most satisfactorily dissolved by contacting them with the reflux and vapors of boiling solvents as hereinbefore described.

Other modes of applying the principle of the invention may be employed instead of those explained, change being made as regards the method herein disclosed, provided the step or steps stated by any of the following claims or the equivalent of such stated step or steps be employed.

I therefore particularly point out and distinctly claim as my invention:

1. The method of dissolving a thermoplastic organic resin which comprises contacting the resin with a downward flowing liquid solvent therefor while at the same time passing a substantially inert vapor upward about the resin.

2. The method of dissolving a thermoplastic organic resin which comprises causing a heated liquid solvent for the resin to flow downward through a bed of the resin while passing a substantially inert vapor upward through the bed to facilitate drainage of resin solution away from undissolved portions of the resin.

3. The method of dissolving a thermoplastic organic resin which comprises simultaneously contacting the resin with the upward flowing vapors and downward flowing reflux of a boiling solvent.

4. The method of dissolving a thermoplastic organic resin which comprises boiling a solvent for the resin and causing the solvent vapors to pass upward into and at least partially to condense in contact with a bed of the resin and flow downward within said bed.

5. The method of dissolving a vinyl aromatic resin which comprises simultaneously contacting the resin with the upward flowing vapors and downward flowing reflux of a boiling solvent.

6. The method of dissolving polystyrene which comprises simultaneously contacting the latter with the upward flowing vapors and downward flowing reflux of a boiling solvent.

ROBERT R. DREISBACH.